(12) United States Patent
Kettner et al.

(10) Patent No.: US 12,383,004 B2
(45) Date of Patent: Aug. 12, 2025

(54) GLOVE AS WELL AS WEARABLE SENSOR DEVICE COMPRISING A GLOVE AND AN ELECTRONIC MODULE

(71) Applicant: Workaround GmbH, Munich (DE)

(72) Inventors: Michael Kettner, Munich (DE); Danijel Juric, Munich (DE); Simon Armbruster, Munich (DE)

(73) Assignee: WORKAROUND GMBH, Munich (DE)

( * ) Notice: Subject to any disclaimer, the term of this patent is extended or adjusted under 35 U.S.C. 154(b) by 20 days.

(21) Appl. No.: 17/964,324

(22) Filed: Oct. 12, 2022

(65) Prior Publication Data
US 2023/0112442 A1 Apr. 13, 2023

(30) Foreign Application Priority Data
Oct. 13, 2021 (DE) ...................... 10 2021 126 552.5

(51) Int. Cl.
*A41D 19/00* (2006.01)
*G06K 7/10* (2006.01)
*G06K 7/14* (2006.01)

(52) U.S. Cl.
CPC ..... *A41D 19/0024* (2013.01); *G06K 7/10396* (2013.01); *G06K 7/10891* (2013.01);
(Continued)

(58) Field of Classification Search
CPC .............. A41D 19/015; A41D 19/0037; A41D 19/0024; A41D 19/0013; A41D 19/0003; A41D 19/0157; A41D 13/08; A41D 13/081; A41D 13/088; G06K 7/10396; G06K 7/10891; G06K 2007/10534
See application file for complete search history.

(56) References Cited

U.S. PATENT DOCUMENTS 1,165,970 A 12/1915 Harris
1,173,269 A 2/1916 Heidemann
(Continued)

FOREIGN PATENT DOCUMENTS

AT 521938 A3 12/2021
AT 521938 B1 12/2021
(Continued)

OTHER PUBLICATIONS

Borghetti M. et al., "Sensorized Glove for Measuring Hand Finger Flexion for Rehabilitation Purposes," IEEE Transactions on Instrumentation and Measurement, vol. 62, No. 12, Dec. 2013.
(Continued)

*Primary Examiner* — Uyen T Nguyen
(74) *Attorney, Agent, or Firm* — DILWORTH IP, LLC

(57) ABSTRACT

A work glove including a dorsal section, a strap section, a trigger and a holder for an electronic module. The dorsal section includes a first opening on the side-of-the-hand edge and the strap section extends from the thumb-side edge or the dorsal section includes a first opening on the thumb-side edge and the strap section extends from the side-of-the-hand edge of the dorsal section. The strap section passes through the first opening and a portion of the strap section that passed through the first opening fastens the dorsal section detachably. Moreover, a wearable sensor device is shown.

18 Claims, 3 Drawing Sheets

(52) U.S. Cl.
CPC ......... *G06K 7/1413* (2013.01); *G06K 7/1417*
(2013.01); *G06K 2007/10534* (2013.01)

(56) References Cited

U.S. PATENT DOCUMENTS

| | | | |
|---|---|---|---|
| 1,267,436 A * | 5/1918 | Martin | A41D 19/0157 |
| | | | 116/35 R |
| 2,172,167 A | 9/1939 | Leventhal | |
| 3,512,776 A * | 5/1970 | Thomas, Sr. | A41D 13/088 |
| | | | 2/161.7 |
| 3,700,836 A | 10/1972 | Rackson | |
| 3,790,168 A * | 2/1974 | Hashimoto | A41D 13/088 |
| | | | 473/62 |
| 4,504,980 A | 3/1985 | Butcher | |
| 4,575,075 A | 3/1986 | Tarbox | |
| 4,658,441 A | 4/1987 | Smith | |
| 4,766,299 A | 8/1988 | Tierney | |
| 5,133,233 A | 7/1992 | Erwin | |
| 5,191,197 A | 3/1993 | Metlitsky | |
| 5,212,372 A | 5/1993 | Quick | |
| 5,255,167 A | 10/1993 | Toussaint | |
| 5,319,185 A | 6/1994 | Obata | |
| 5,329,106 A | 7/1994 | Hone | |
| 5,340,972 A | 8/1994 | Sandor | |
| 5,365,213 A * | 11/1994 | Paull | G08B 21/0297 |
| | | | 340/321 |
| 5,396,053 A | 3/1995 | Swartz | |
| 5,397,296 A | 3/1995 | Sydor et al. | |
| 5,406,649 A | 4/1995 | Bolembach | |
| 5,459,883 A | 10/1995 | Garceau-Verbeck | |
| 5,514,861 A | 5/1996 | Swartz | |
| 5,550,366 A | 8/1996 | Roustaei | |
| 5,580,154 A | 12/1996 | Coulter | |
| 5,592,694 A | 1/1997 | Yewer, Jr. | |
| 5,610,387 A | 3/1997 | Bard | |
| 5,625,180 A | 4/1997 | Hanson | |
| 5,640,712 A | 6/1997 | Hansen | |
| 5,654,534 A | 8/1997 | Coleman | |
| 5,787,896 A * | 8/1998 | Sackett | A41D 19/01588 |
| | | | 128/880 |
| 5,898,161 A | 4/1999 | Devita | |
| 5,924,136 A | 7/1999 | Ogean | |
| 6,154,199 A | 11/2000 | Butler | |
| 6,232,960 B1 | 5/2001 | Goldman | |
| 6,234,393 B1 | 5/2001 | Paratore | |
| 6,341,376 B1 * | 1/2002 | Smerdon, Jr. | A41D 13/082 |
| | | | 2/161.1 |
| 6,505,776 B1 | 1/2003 | Wilz, Sr. | |
| 6,853,293 B2 | 2/2005 | Swartz | |
| 6,991,364 B2 | 1/2006 | Yang | |
| 7,307,242 B1 | 12/2007 | Chen | |
| 7,480,944 B2 | 1/2009 | Nascimento | |
| 7,504,949 B1 | 3/2009 | Rouaix | |
| 7,837,112 B2 | 11/2010 | An | |
| 7,959,314 B1 | 6/2011 | Rodriguez | |
| 8,038,310 B1 | 10/2011 | Hale | |
| 8,230,522 B1 | 7/2012 | Bell | |
| 8,235,294 B2 | 8/2012 | Miller | |
| 8,376,759 B2 | 2/2013 | Debock | |
| 8,449,541 B2 | 5/2013 | Schneider | |
| 8,523,377 B1 | 9/2013 | York | |
| 8,540,389 B2 | 9/2013 | Tang | |
| 8,562,165 B2 | 10/2013 | Thompson | |
| 9,082,293 B2 | 7/2015 | Wellman | |
| 9,235,742 B1 | 1/2016 | Qaddoura | |
| 9,301,562 B1 | 4/2016 | Chen | |
| 9,785,877 B1 | 10/2017 | Fink | |
| 9,842,288 B1 | 12/2017 | Debates | |
| 9,895,106 B1 | 2/2018 | Graybill | |
| 9,900,061 B1 | 2/2018 | Lui | |
| 10,064,276 B2 | 8/2018 | Williams | |
| 10,135,213 B2 | 11/2018 | Brunnbauer | |
| 10,537,143 B2 | 1/2020 | Guenther | |
| 10,789,436 B1 | 9/2020 | Lim | |
| 10,817,689 B2 | 10/2020 | Mazzone | |
| 10,996,754 B2 | 5/2021 | Bosworth | |
| D922,063 S | 6/2021 | Kirchner | |
| 11,044,898 B2 | 6/2021 | Deeb | |
| 11,059,076 B2 | 7/2021 | Bauer | |
| 11,093,725 B2 | 8/2021 | Mistkawi | |
| 11,121,515 B2 | 9/2021 | Chahine | |
| 11,182,575 B2 | 11/2021 | Sakamoto | |
| D943,585 S | 2/2022 | Engineer | |
| D944,814 S | 3/2022 | Huber | |
| D945,423 S | 3/2022 | Lim | |
| 11,326,960 B2 | 5/2022 | Larsen | |
| 11,361,391 B2 | 6/2022 | Ottnad | |
| D960,162 S | 8/2022 | Lim | |
| D964,376 S | 9/2022 | Sittig | |
| 11,464,450 B2 | 10/2022 | Huang | |
| 11,470,895 B2 | 10/2022 | Guenther | |
| 11,508,018 B2 | 11/2022 | Yoshimoto | |
| 11,520,314 B2 | 12/2022 | Schwarz | |
| 11,558,909 B2 | 1/2023 | Hutter | |
| 11,589,625 B2 | 2/2023 | Oner | |
| D986,253 S | 5/2023 | Kettner | |
| 11,759,288 B2 | 9/2023 | Lenzenhuber | |
| 11,792,555 B2 | 10/2023 | Nöllgen | |
| 11,899,838 B2 | 2/2024 | Hogbin | |
| 11,913,145 B2 | 2/2024 | Laukamp | |
| 11,914,771 B2 | 2/2024 | Kirchner | |
| 2002/0080031 A1 | 6/2002 | Mann | |
| 2002/0163495 A1 | 11/2002 | Doynov | |
| 2002/0194668 A1 | 12/2002 | Kwon | |
| 2003/0006962 A1 | 1/2003 | Bajramovic | |
| 2003/0011469 A1 | 1/2003 | Bush | |
| 2003/0026170 A1 | 2/2003 | Yang | |
| 2004/0025227 A1 | 2/2004 | Jaeger | |
| 2004/0128736 A1 | 7/2004 | Raz | |
| 2005/0052412 A1 | 3/2005 | McRae | |
| 2006/0033710 A1 | 2/2006 | Bajramovic | |
| 2006/0044112 A1 | 3/2006 | Bridgelall | |
| 2006/0108425 A1 | 5/2006 | Wiklof | |
| 2007/0083968 A1 | 4/2007 | Stokes | |
| 2007/0083979 A1 | 4/2007 | Daniels | |
| 2007/0146127 A1 | 6/2007 | Stilp | |
| 2007/0245454 A1 | 10/2007 | Eklund | |
| 2007/0288104 A1 | 12/2007 | Yamauchi | |
| 2008/0054062 A1 | 3/2008 | Gunning | |
| 2008/0071429 A1 | 3/2008 | Kraimer | |
| 2008/0136778 A1 | 6/2008 | Hursh | |
| 2008/0262666 A1 | 10/2008 | Manning | |
| 2009/0056107 A1 | 3/2009 | Williams | |
| 2009/0057289 A1 | 3/2009 | Williams | |
| 2009/0057290 A1 | 3/2009 | Williams | |
| 2009/0121026 A1 | 5/2009 | Druker | |
| 2009/0156309 A1 | 6/2009 | Weston | |
| 2009/0179739 A1 | 7/2009 | Kim | |
| 2009/0247299 A1 | 10/2009 | Conticello | |
| 2010/0023314 A1 | 1/2010 | Hernandez-Rebollar | |
| 2010/0090949 A1 | 4/2010 | Tianqiao | |
| 2010/0097195 A1 | 4/2010 | Majoros | |
| 2010/0156783 A1 | 6/2010 | Bajramovic | |
| 2010/0234182 A1 | 9/2010 | Hoffman | |
| 2011/0016609 A1 | 1/2011 | Phelps | |
| 2011/0078842 A1 | 4/2011 | Tang | |
| 2011/0122601 A1 | 5/2011 | Waters | |
| 2011/0296576 A1 * | 12/2011 | Mitchell | A41D 13/082 |
| | | | 2/16 |
| 2012/0025945 A1 | 2/2012 | Yazadi | |
| 2012/0157263 A1 | 6/2012 | Sivak | |
| 2012/0187192 A1 | 7/2012 | Lee | |
| 2012/0223143 A1 | 9/2012 | Turbovich | |
| 2013/0087544 A1 | 4/2013 | Kremer | |
| 2013/0197720 A1 | 8/2013 | Kraimer | |
| 2013/0258644 A1 | 10/2013 | Comunale | |
| 2014/0096306 A1 | 4/2014 | Hill | |
| 2014/0125577 A1 | 5/2014 | Hoang | |
| 2014/0132410 A1 | 5/2014 | Chang | |
| 2014/0172134 A1 | 6/2014 | Meschter | |
| 2014/0194166 A1 | 7/2014 | Falck | |
| 2014/0214631 A1 | 7/2014 | Hansen | |
| 2014/0215686 A1 | 8/2014 | McMakin, Jr. | |
| 2014/0249944 A1 | 9/2014 | Hicks | |

(56) References Cited

U.S. PATENT DOCUMENTS

| | | |
|---|---|---|
| 2014/0282923 A1 | 9/2014 | Narayan |
| 2014/0366249 A1 | 12/2014 | West |
| 2015/0040880 A1 | 2/2015 | Tseng |
| 2015/0070162 A1 | 3/2015 | Vorhies |
| 2015/0130698 A1 | 5/2015 | Burgess |
| 2015/0150321 A1 | 6/2015 | Vorhies |
| 2015/0257733 A1 | 9/2015 | Corbett, III |
| 2015/0286976 A1 | 10/2015 | Hirschfeld |
| 2015/0314195 A1 | 11/2015 | Bekri |
| 2015/0375042 A1 | 12/2015 | Schaffer |
| 2016/0016065 A1 | 1/2016 | Tan |
| 2016/0018901 A1 | 1/2016 | Woolley |
| 2016/0033238 A1 | 2/2016 | Cooper |
| 2016/0066636 A1 | 3/2016 | West |
| 2016/0068214 A1 | 3/2016 | Tang |
| 2016/0128406 A1 | 5/2016 | Shiue |
| 2016/0161301 A1 | 6/2016 | Guenther |
| 2016/0174897 A1 | 6/2016 | Sherman |
| 2016/0284236 A1 | 9/2016 | Bavunoglu |
| 2017/0068276 A1 | 3/2017 | Wagman |
| 2017/0119553 A1 | 5/2017 | Cipriani |
| 2017/0168565 A1 | 6/2017 | Cohen |
| 2017/0215497 A1* | 8/2017 | Frederick ............ A61F 5/0118 |
| 2017/0265561 A1 | 9/2017 | Beers |
| 2017/0296098 A9 | 10/2017 | Ban |
| 2017/0338610 A1 | 11/2017 | Brunnbauer |
| 2018/0027344 A1 | 1/2018 | Dzarnoski, Jr. |
| 2018/0146720 A1 | 5/2018 | Sittig |
| 2018/0213758 A1 | 8/2018 | Deeb |
| 2018/0295908 A1 | 10/2018 | Hollo |
| 2018/0326592 A1 | 11/2018 | Kogan |
| 2018/0376043 A1 | 12/2018 | Schannath |
| 2019/0197273 A1 | 6/2019 | Mazzone |
| 2019/0209086 A1 | 7/2019 | Huang |
| 2019/0213363 A1 | 7/2019 | Sugiura |
| 2019/0216144 A1 | 7/2019 | York |
| 2019/0364996 A1* | 12/2019 | Kettner ............ A41D 19/0024 |
| 2020/0022433 A1 | 1/2020 | Lu |
| 2020/0134275 A1 | 4/2020 | Sakamoto |
| 2020/0160016 A1 | 5/2020 | Sakamoto |
| 2020/0237032 A1* | 7/2020 | Berlips ............ A41D 19/0027 |
| 2020/0245939 A1 | 8/2020 | Sittig |
| 2020/0305522 A1 | 10/2020 | Ruhland |
| 2020/0359721 A1 | 11/2020 | Meroe |
| 2020/0404993 A1 | 12/2020 | Phillips |
| 2021/0033472 A1 | 2/2021 | Turner |
| 2021/0219639 A1 | 7/2021 | Kettner |
| 2021/0262127 A1 | 8/2021 | Laukamp |
| 2021/0307433 A1 | 10/2021 | Hollo |
| 2021/0386132 A1* | 12/2021 | Goldberg-Poch ...... A41D 31/02 |
| 2022/0053854 A1 | 2/2022 | Oner |
| 2022/0100895 A1 | 3/2022 | Kirchner |
| 2022/0159355 A1 | 5/2022 | Nöllgen |
| 2023/0112442 A1 | 4/2023 | Kettner |
| 2023/0115522 A1 | 4/2023 | Hutter |
| 2024/0164459 A1 | 5/2024 | Clark |
| 2024/0237767 A1 | 7/2024 | Kettner |

FOREIGN PATENT DOCUMENTS

| | | |
|---|---|---|
| CN | 2109745 | 7/1992 |
| CN | 204217957 U | 3/2015 |
| CN | 107616787 A | 1/2018 |
| CN | 108272443 A | 7/2018 |
| CN | 109891340 A | 6/2019 |
| CN | 109891342 A | 6/2019 |
| CN | 110327049 A | 10/2019 |
| CN | 110647847 A | 1/2020 |
| CN | 112218387 A | 1/2021 |
| CN | 112294538 A | 2/2021 |
| CN | 306506527 * | 5/2021 |
| CN | 306506527 S | 5/2021 |
| CN | 113144571 A | 7/2021 |
| CN | 110327049 B | 11/2021 |
| CN | 109891340 B | 7/2022 |
| DE | 202005003216 | 5/2005 |
| DE | 202013105192 | 12/2013 |
| DE | 102014117164 | 1/2016 |
| DE | 202015107112 | 1/2016 |
| DE | 102015111506 A1 | 4/2016 |
| DE | 102015113847 | 4/2016 |
| DE | 102015214331 | 2/2017 |
| DE | 102015122281 | 6/2017 |
| DE | 102015224308 | 6/2017 |
| DE | 102016109113 A1 | 11/2017 |
| DE | 102016109117 | 11/2017 |
| DE | 102017107357 A1 | 4/2018 |
| DE | 102016123093 A1 | 5/2018 |
| DE | 202017102714 U1 | 8/2018 |
| DE | 102017203495 | 9/2018 |
| DE | 102018202207 A1 | 8/2019 |
| DE | 102018105578 A1 | 9/2019 |
| DE | 102018203035 A1 | 9/2019 |
| DE | 102018112945 A1 | 12/2019 |
| DE | 102018105578 B4 | 6/2020 |
| DE | 102019102685 A1 | 8/2020 |
| DE | 102019102730 A1 | 8/2020 |
| DE | 102019113964 A1 | 11/2020 |
| DE | 102019118887 A1 | 1/2021 |
| DE | 102019118969 A1 | 1/2021 |
| DE | 102019131235 A1 | 5/2021 |
| DE | 102020100985 A1 | 7/2021 |
| DE | 102020106369 A1 | 9/2021 |
| DE | 102020122573 A1 | 3/2022 |
| DE | 102020125554 A1 | 3/2022 |
| DE | 102021200888 A1 | 8/2022 |
| DE | 102019131235 B4 | 9/2022 |
| DE | 102021122485 A1 | 3/2023 |
| DE | 102021134380 A1 | 6/2023 |
| DE | 102022132061 A1 | 6/2024 |
| DE | 102023000106 B3 | 6/2024 |
| EP | 0613762 | 9/1994 |
| EP | 1894481 A1 | 3/2008 |
| EP | 2578096 A1 | 4/2013 |
| EP | 2693689 | 2/2014 |
| EP | 3069623 | 9/2016 |
| EP | 3208687 | 8/2017 |
| EP | 3381839 A1 | 10/2018 |
| EP | 3644217 A1 | 4/2020 |
| EP | 3654229 A1 | 5/2020 |
| EP | 3381839 B1 | 1/2022 |
| EP | 4012599 A1 | 6/2022 |
| EP | 3529675 B1 | 12/2022 |
| EP | 4374727 A1 | 5/2024 |
| GB | 2386667 A | 9/2003 |
| GB | 2386677 | 9/2003 |
| GB | 2422527 | 8/2006 |
| GB | 2441295 | 3/2008 |
| GB | 2567214 A | 4/2019 |
| IT | 201700092386 A1 | 2/2019 |
| IT | 202000002125 A1 | 8/2021 |
| JP | 2001084329 A | 3/2001 |
| JP | 2011094246 | 5/2011 |
| JP | 2020503582 A | 1/2020 |
| JP | 7105766 B2 | 7/2022 |
| KR | 20100024593 A | 3/2010 |
| KR | 20110115497 A | 10/2011 |
| KR | 20210127051 A | 10/2021 |
| RU | 210103 U1 | 3/2022 |
| TW | M484318 | 8/2014 |
| WO | 9318675 | 9/1993 |
| WO | 9850839 | 11/1998 |
| WO | 02088918 | 11/2002 |
| WO | 03005176 | 1/2003 |
| WO | 2006077572 | 7/2006 |
| WO | 2008075859 | 6/2008 |
| WO | 2012036775 | 3/2012 |
| WO | 2014011196 | 1/2014 |
| WO | 2016012480 | 1/2016 |
| WO | 2017062621 | 4/2017 |
| WO | 2018073420 A1 | 4/2018 |
| WO | 2018076067 A1 | 5/2018 |
| WO | 2018099430 A1 | 6/2018 |
| WO | 2019018702 A1 | 1/2019 |

(56) References Cited

FOREIGN PATENT DOCUMENTS

| WO | 2020117166 A3 | 7/2020 |
| WO | 2021014179 A3 | 4/2021 |
| WO | 2021099138 A1 | 5/2021 |
| WO | 2021101402 A1 | 5/2021 |
| WO | 2021156709 A1 | 8/2021 |
| WO | 2022035820 A1 | 2/2022 |
| WO | 2023019535 A1 | 2/2023 |
| WO | 2024023009 A1 | 2/2024 |

OTHER PUBLICATIONS

Dipietro L. et al., "A Survey of Glove-Based Systems and Their Applications," IEEE Transactions on Systems, Man, and Cybernetics—Part C: Applications and Reviews, vol. 38, No. 4, Jul. 2008.

Kim, J-H. et al., 3-D Hand Motion Tracking and Gesture Recognition Using a Data Glove, IEEE International Symposium on Industrial Electronics (ISIE 2009), Seoul Olympic Parktel, Seoul, Korea, Jul. 5-8, 2009.

King, R. C. et al., "Development of a Wireless Sensor Glove for Surgical Skills Assessment," IEEEE Transactions on Information Technology in Biomedicine, vol. 13, No. 5, Sep. 2009.

Simone, L. K. et al., "A low cost instrumented glove for extended monitoring and functional hand assessment," Journal of Neuroscience Methods 160 (2007) 335-348.

Sturman, D.J. et al., "A Survey of Glove-based Input," IEEE Computer Graphics & Applications (1994) 33-39.

Ziegler, J. et al., "Advanced Interaction Metaphors for RFID—Tagged Physical Artefacts," 2011 IEEE International Conference on RFID—Technologies and Applications, 73-80.

Albert Schweitzer: "Rigid-Flex, Flex and Semi-Flex Leiterplatten Technologie", Mar. 17, 2017, https://www.flowcad.ch/cms/upload/downloads/PCBRoadshow20IFlex.pdf (89 pages).

Opposition filed against German Patent No. DE102015017430B3, on May 10, 2024 with translation. 137 pages.

* cited by examiner

GLOVE AS WELL AS WEARABLE SENSOR DEVICE COMPRISING A GLOVE AND AN ELECTRONIC MODULE

FIELD OF THE DISCLOSURE

The disclosure relates to a glove, in particular a work glove as well as a wearable sensor device comprising a glove and an electronic module.

BACKGROUND

Gloves comprising electrical triggers are known and are used, for example, in combination with one or several electronic modules. These electronic modules typically have sensors and can also be attached to the glove, resulting in a wearable sensor system, what is termed a "wearable".

For example, the electronic module is a barcode scanner and the trigger is used to trigger a scanning process. The trigger can also be used for other purposes, such as counting processes or operating further units of the wearable. Therefore, the electrical trigger must be simple to trigger, but also protected from being triggered accidentally.

The gloves are also worn by a variety of different users who are naturally different in size and thus have different sized hands. It is therefore necessary to provide gloves in different sizes, thus increasing production, logistics and storage costs.

SUMMARY

Thus, there is a need to provide a glove as well as wearable sensor device that has a universal size and can therefore be fastened to the hand reliably and securely irrespective of user's hand size.

The object is solved by a glove, in particular a work glove, comprising a dorsal section, a strap section, a trigger and a holder for an electronic module that is attached to the dorsal section. The dorsal section comprises a thumb-side edge, a wrist-side edge and a side-of-the-hand edge. The dorsal section comprises a first opening on the side-of-the-hand edge and the strap section extends from the thumb-side edge or the dorsal section comprises a first opening on the thumb-side edge and the strap section extends from the side-of-the-hand edge of the dorsal section. In the closed state of the glove, the strap section passes through the first opening and a portion of the strap section that passed through the first opening fastens the dorsal section detachably.

The disclosure is based on the finding that the glove, in particular the trigger section and the dorsal section, can be fastened to the user's hand durably, securely and reliably if a strap section secures the glove along the palm of the hand. By means of the first opening and a detachable fastening of the dorsal section, enough tensile force can be applied to the dorsal section to fasten this to the hand securely. Simultaneously, the fastening with the strap section is flexible so that the glove can be fastened to different-sized hands.

In this regard, requirements related to occupational safety, such as avoiding loops and protruding material parts, e.g. on the dorsum of the hand, are met reliably.

For example, the portion of the strap section that passed through the first opening is attached or fastened detachably to the dorsal section, in particular the wrist-side portion of the dorsal section.

In particular, the strap section has a free end and an end that is permanently connected to the trigger section or the dorsal section and is opposite the free end. The free end is part of the area that passes through the first opening.

For example, an area for a user's hand is formed in the closed state between the strap section and the dorsal section.

The strap section can be formed as a band and/or designed to fasten the glove onto a user's hand.

For example, the dorsal section in the correctly worn state covers the dorsum of the user's hand and/or the strap section extends across the palm, in particular twice.

The trigger section can also extend from the finger-side edge, in particular in the principal direction.

Within the scope of this disclosure, the direction from the wrist-side edge towards the finger-side edge is regarded, for example, as the principal direction.

In an embodiment, the dorsal section comprises a trigger section on which the trigger is attached, wherein the trigger section is provided on the thumb-side edge of the dorsal section and wherein the strap section extends from the trigger section or wherein the first opening is provided on the trigger section. In this way, the trigger section and thus the trigger are placed particularly reliably and are easily reachable on the user's hand.

In an embodiment, the trigger section comprises a tongue that extends in the principal direction away from both the strap section as well as the dorsal section, in particular wherein the trigger is located at least in part on the tongue. By doing so, the trigger is positioned optimally on the metacarpophalangeal joint of the index finger without limiting the mobility of the finger.

For even more reliable fastening of the trigger section, the trigger section can be provided between the strap section and the dorsal section and/or the strap section can start at the edge of the trigger section facing away from the dorsal section.

For example, the strap section is made of a stretchable and/or elastic material, in particular along the longitudinal direction of the strap section, thereby making the glove particularly tight-fitting. The direction from the permanently connected end towards the free end is regarded as the longitudinal direction.

In an embodiment, the strap section runs towards the wrist-side edge in the closed, in particular, correctly worn state counter to the principal direction and/or has a V-shaped form, in particular wherein the first opening is the tip of the V shape or the V-shaped form. In this way, the fastening of the glove onto the hand is improved further.

For example, the user's thumb extends through an area that is defined by the strap section, in particular by the lines of the V-shaped form, and the thumb-side edge.

In one aspect, the glove is designed without any loops for fingers and/or without a palm section, thereby making it possible to put the glove on easily. The strap section is not to be regarded as the palm section as the palm largely remains free even in the worn state.

For reliable attachment of the trigger section, the trigger section can be provided between the strap section and the dorsal section and/or the strap section can start at the edge of the trigger section facing away from the dorsal section.

For example, the trigger section is the only permanent connection between the strap section and the dorsal section.

In an embodiment, a fastening means for detachable fastening of the portion of the strap section that passed through the first opening is located on the dorsal section, in particular on the wrist-side edge of the dorsal section. In this way, the detachable fastening of the strap section can be made even more reliable.

For example, the fastening means comprises a hook-and-loop-fastener strip and the strap section comprises a complementary hook-and-loop-fastener strip, thereby realizing the detachable fastening particularly simply.

Alternatively or additionally, the fastening means can comprise a second opening through which the strap section extends in the closed state, in particular wherein the strap section has on one side two hook-and-loop-fastener strips that are complementary to each other. As a result, the detachable connection is made more secure.

In particular, the portion of the strap section that passed through the first opening extends at least in part also through the second opening.

So that the glove fits even more closely, the second opening can be located on the thumb-side edge and/or a main axis of the second opening extends parallel to the thumb-side edge.

In one aspect, the fastening means is located in the principal direction closer to the wrist-side edge than the first opening, the trigger section and/or the permanently connected end of the strap section in order to improve the fastening of the glove further.

The glove can be particularly tight-fitting if the first opening is located in the principal direction closer to the wrist-side edge than the trigger section and/or the permanently connected end of the strap section.

In an embodiment, the dorsal section has a width between the thumb-side edge and the side-of-the-hand edge, wherein strap section has a length that is at least two times, in particular 2.5 times the width of dorsal section, thereby ensuring that the glove is deployable on many different sizes of hand.

The trigger in the principal direction of the glove can be further away from the wrist-side edge than 75% of the holder, in particular the entire holder, so that the trigger is easily reachable.

In an embodiment, the glove has a base body that comprises the dorsal section, the strap section and the trigger section, thereby making it possible to manufacture the glove simply.

The dorsal section, the strap section and the trigger section can be designed together as one piece.

To produce a reliable electrical connection between the trigger and the electronic module, the holder can have at least one electrical contact element that is connected electrically to the trigger by means of a cable, in particular a flex PCB cable.

In an embodiment, the trigger and/or the cable are covered by a protective layer, in particular a protective layer that differs from the base body, thereby improving the service life of the glove.

In an embodiment, the portion of the strap section that passed through the first opening and is not fastened to the dorsal section is fastened to another portion of the strap section in the closed state of the glove. In this way, excess length of the strap section is stowed away securely.

Moreover, the object is solved by a wearable sensor device comprising a glove as previously described and an electronic module that is inserted into the holder, in particular wherein the electronic module comprises a camera, a scanner for identifiers such as barcodes, 2D codes or RFID tags and/or a display for displaying instructions to the user that are triggerable by actuating the trigger.

The features and advantages described for the glove apply equally to the sensor device and vice versa.

BRIEF DESCRIPTION OF THE DRAWINGS

Additional advantages and features can be found in the following description as well as in the attached drawings to which reference is made. In the drawings.

DETAILED DESCRIPTION

Lists having a plurality of alternatives connected by "and/or", for example "A, B and/or C" are to be understood to disclose an arbitrary combination of the alternatives, i.e. the lists are to be read as "A and/or B and/or C". The same holds true for listings with more than three items.

Figure 1:
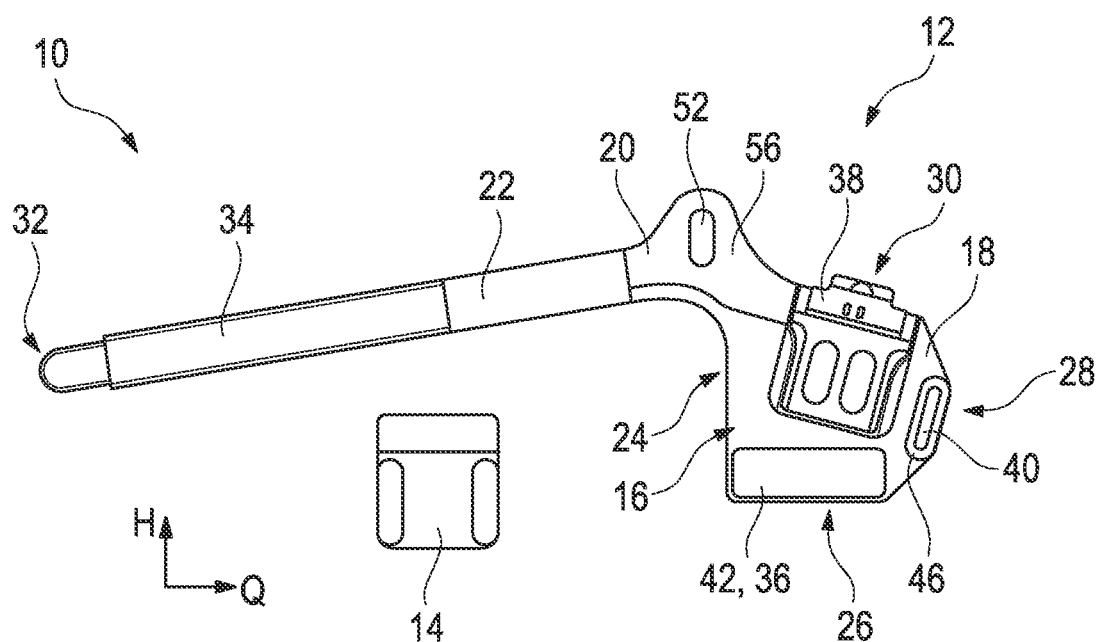
FIG. 1 shows a wearable sensor device according to the disclosure comprising a glove according to the disclosure in top view in a position spread out on a table.

In FIG. 1, a wearable sensor device 10 is shown comprising a glove 12 and an electronic module 14.

The electronic module 14 is, for example, a compact and robust device for industrial applications. In particular, the electronic module 14 comprises a camera, a scanner for identifiers such as barcodes, 2D codes or RFID tags and/or a display for displaying instructions to the user.

In particular, the electronic module 14 is not a smart device such as a smartphone.

The glove 12 is shown in FIG. 1 in a state in which it is spread out on a flat surface, for example spread out on a table.

The glove 12 comprises a base body 16 that is made of an elastic material, such as neoprene, limitation leather, synthetic leather (for example microfibers) and/or spacer fabrics.

The base body 16 and in particular the entire glove 12 do not have any fingers or appendages for fingers.

The glove 12 and the base body 16 also do not have a palm section, i.e. a section that rests on the palm of the hand in the correctly worn state and covers the majority of the palm, in particular more than 50%.

The glove 12 of the shown embodiment is thus not a full glove with fingers, but rather a glove which only covers the dorsum of a user's hand, provided it is being worn correctly. The glove 12 is thus similar to a bandage that only surrounds parts of the hand and does not need to be pulled over the hand, but rather is closed around the hand.

The base body 16 comprises a dorsal section 18 with a trigger section 20 and a strap section 22.

The dorsal section 18 with the trigger section 20 and the strap section 22 are therefore designed as one piece.

The dorsal section 18 comprises a thumb-side edge 24, a wrist-side edge 26, a side-of-the-hand edge 28 as well as a finger-side edge 30. The edges 24, 26, 28, 30 are located in this order counterclockwise.

The designations "thumb-side", "wrist-side", "side-of-the-hand" and "finger-side" relate to the position of the corresponding edge 24, 26, 28, 30 in relation to the user's hand in the correctly worn state of the glove 12.

For simplification, a top side and an underside of the glove 12 or the base body 16 and its sections are referred to within the context of this disclosure. The top side is the side visible in FIG. 1 while the underside is the side hidden from view.

With regard to the dorsal section 18 and the trigger section 20, the top side is that side that is facing away from the user's hand when the glove 12 is worn correctly and accordingly the underside rests against the user's hand.

The thumb-side edge 24 and the side-of-the-hand edge 28 are opposite each other. Similarly, the wrist-side edge 26 and the finger-side edge 30 are opposite one another.

For simplification, the direction extending from the wrist-side edge 26 towards the finger-side edge 30 is regarded as the principal direction H within the context of this disclosure. This direction can be regarded as the extension of the user's arm if both the arm and the hand are fully extended. The traverse direction Q of the glove 12 is perpendicular to this.

The trigger section 20 extends from the thumb-side edge 24 of the rest of the dorsal section 18 in the traverse direction Q and also from the finger-side edge 30 in the principal direction H.

For example, the trigger section 20 extends from the portion of the rest of the dorsal section 18 in which the finger-side edge 30 and the thumb-side edge 24 would intersect or merge into each other.

In the shown embodiment, the strap section 22 extends from the trigger section 20, more specifically from the side of the trigger section 20 that is facing away from the dorsal section 18.

The strap section 22 is formed as a band and has an end permanently connected to the trigger section 20 as well as a free end 32. The free end 32 is opposite the end permanently connected to the trigger section 20.

The trigger section 20 is located between the strap section 22 and the dorsal section 18 and is thus the only permanent connection between the strap section 22 and the dorsal section 18.

The length of the strap section 22 from its free end 32 to the end permanently connected to the trigger section 20, in particular to the trigger, is at least 250 mm, in particular at least 340 mm.

The strap section 22 can be designed to be stretchable or elastic in its longitudinal direction, i.e. in a direction from the free end 32 to the end permanently connected to the trigger section 20. For example, the material of the strap section 22 and the material of the base body 16 is stretchable and/or elastic in at least one direction.

On the top side and/or the underside, the strap section 22 comprises a hook-and-loop-fastener strip 34 that extends in particular across at least half of the length of the strap section 22.

The length of the strap section 22 is, for example, twice as large, in particular at least two and a half times larger than the width of the dorsal section 18, thus the distance between the thumb-side edge 24 and the side-of-the-hand edge 28 at the widest point.

In this embodiment, but also in general, if the glove 12 is spread out on a flat surface as shown, an angle α starting at the strap section 22 and ending at the thumb-side edge 24 of the dorsal section 18 can be less than 100°, in particular less than 90°. The angle α is to be measured here in the mathematical direction of rotation (counterclockwise).

The width of the strap section 22 is between 15 and 25 mm, in particular 20 mm.

Figure 2:
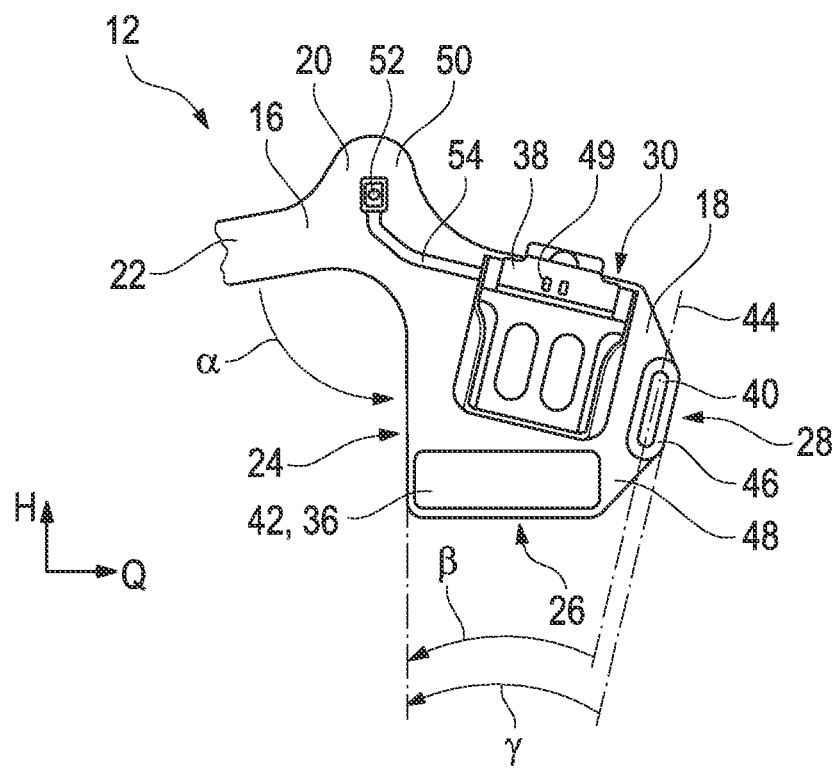
FIG. 2 shows an enlargement of the dorsal section and the trigger section of the glove according to FIG. 1, FIGS. 3 and 4 show the glove according to FIG. 1 worn on a hand in a correctly worn state with views of the palm and dorsum of the hand respectively.

In FIG. 2, a part of the glove 12 is shown enlarged, more specifically the dorsal section 18 and the trigger section 20.

It is clearly evident that a fastening means 36 and a holder 38 for the electronic module 14 are located and attached on the dorsal section 18 on its top side. In addition, the dorsal section 18 comprises a first opening 40.

In the first embodiment shown, the fastening means 36 is a hook-and-loop-fastener strip 42 that is complementary to the hook-and-loop-fastener strip 34 of the strap section 22. This means that the hook-and-loop-fastener strip 34 and the hook-and-loop-fastener strip 42 fasten to each other when they come into contact with each other, thus forming a hook-and-loop fastener.

The hook-and-loop-fastener strip 42 extends along the wrist-side edge 26 of the dorsal section 18.

For example, the hook-and-loop-fastener strip 42 starts at the thumb-side edge 24 and extends almost completely to the side-of-the-hand edge 28, for example in the traverse direction Q.

The fastening means 36, thus the hook-and-loop-fastener strip 42 in the shown embodiment, is therefore located closer to the wrist-side edge 26 than the first opening 40, the trigger section 20 and the permanently connected end of the strap section 22.

The first opening 40 is located on the side-of-the-hand edge 28 and has a length along a main axis 44 that is significantly greater than its length traverse to the main axis 44.

The first opening 40 is thus nearly slit-shaped. Moreover, the first opening 40 can be reinforced using an eyelet 46.

The main axis 44 runs in the shown embodiment parallel to the side-of-the-hand edge 28 of the dorsal section 18.

In this embodiment, but also in every other embodiment, the main axis 44 and the thumb-side edge 24 can form an angle β of less than 90°, in particular less than 80°, wherein the angle β starting at the main axis 44 of the first opening 40 is to be measured in the mathematical direction of rotation (counterclockwise) when the glove 12 is spread out on a flat surface.

Alternatively or additionally, the side-of-the-hand edge 28 with the thumb-side edge 24 can form an angle that is less than 90°, in particular less than 80°, wherein the angle γ starting at the side-of-the-hand edge 28 is to be measured in the mathematical direction of rotation (counterclockwise) when the glove 12 is spread out on a flat surface.

The first opening 40 can be provided on a tab 48 of the dorsal section 18 that protrudes in relation to the holder 38.

The first opening 40 is located in the principal direction H closer to the wrist-side edge 26 than the trigger section 20 and the permanently connected end of the strap section 22.

This specification can relate to both the point closest to the wrist-side edge 26 as well as the center of area of the top view shown in FIG. 1.

The holder 38 is provided on the finger-side edge 30 of the dorsal section 18 and is attached to the top side of the dorsal section 18.

The holder 38 is adjacent to the finger-side edge 30 or projects over the finger-side edge 30. In particular, the holder 38 is located parallel to the finger-side edge 30.

Two contact elements 49 used for the contacting of the electronic module 14 are provided on the holder 38. The contact elements 49 project into a receiving space of the holder 38, in which the electronic module 14 can be inserted.

The electronic module 14 comprises correspondingly implemented mating contacts that contact to the contact elements 49 electrically when the electronic module 14 is inserted in the holder 38.

The trigger section 20 comprises a tongue 50 as well as a trigger 52.

The tongue 50 extends away from the wrist-side edge 26 in the principal direction H, namely further than the point of the strap section 22 and the point of the dorsal section 18 which are in each case furthest from the wrist-side edge 26.

The trigger 52 is located on the tongue 50 at least partially, in particular completely.

The trigger 52 is, for example, a mechanical push button that is attached to the top side of the trigger section 20.

In the principal direction H, the trigger 52 is further away from wrist-side edge 26 than 75% of the holder 38, in particular the entire holder 38. This specification can be understood in relation to the surface of the holder 38 in the top view shown in FIGS. 1 and 2.

The trigger 52 is connected to the holder 38, in particular the contact elements 49 of the holder 38, by means of a cable 54 that is designed as a flex PCB cable in the shown embodiment.

The trigger 52 and the cable 54 are covered by a protective layer 56 that is not shown in FIG. 2. The protective layer 56 can be made of a material that differs from the material of base body 16. In particular, the protective layer 56 has a first section that covers the trigger 52, for example using a thermoplastic such as TPU, and a second section that covers the cable 54 and surrounds the trigger 52.

Figure 3:
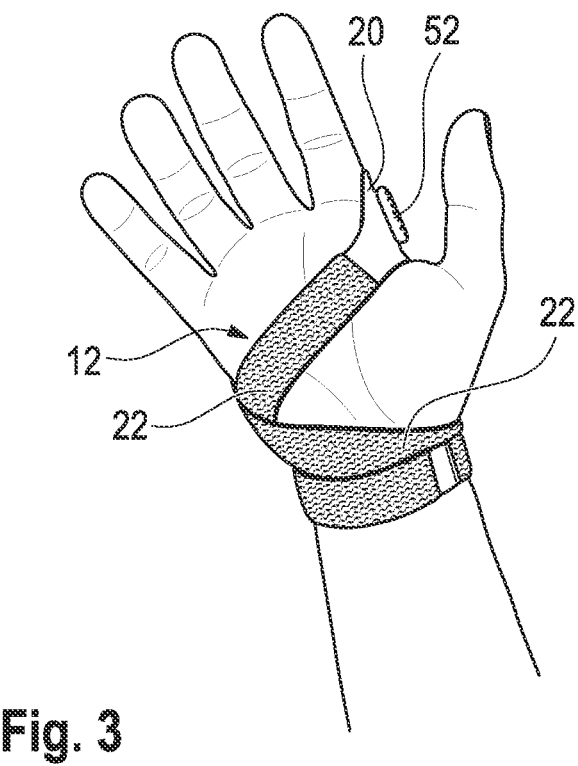
Figure 4:
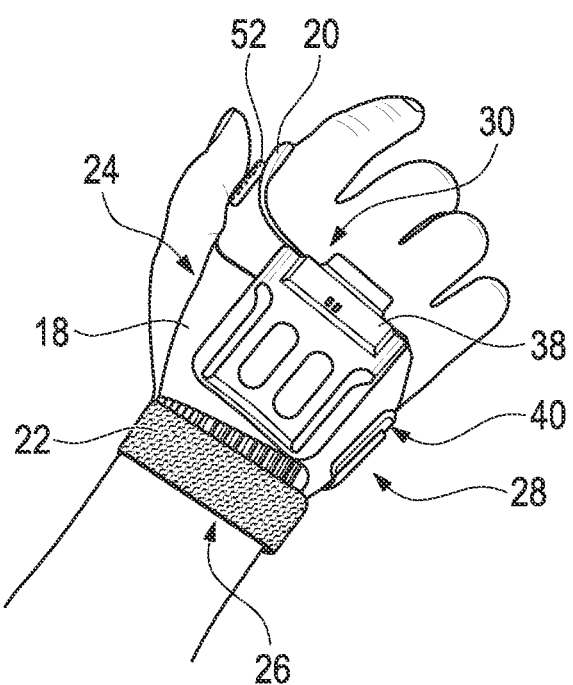

In FIGS. 3 and 4, the glove 12 is shown in the closed state and at the same time on the user's hand in the correctly worn state. The closed state of the glove 12 can be attained by fastening the strap section 22 onto the dorsal section 18 as described hereinafter, more specifically the first opening 40 and the fastening means 36.

In the correctly worn state, the dorsal section 18 rests with its underside on the dorsum of the user's hand. The trigger section 20, in particular the area of the trigger 52, rests with the underside on the metacarpophalangeal joint of the index finger and the strap section 22 extends twice around the palm.

To this end, the strap section 22 runs from the trigger section 20 through the first opening 40 that now rests on the side of the hand. Then, the portion of the strap section 22 that passed through the first opening 40, thus was guided through said opening, runs across the palm towards the fastening means 36, thus in this case to the hook-and-loop-fastener strip 42.

The portion of the strap section 22 that passed through the first opening 40 thus reaches the fastening means 36 via the wrist-side edge 26 of the dorsal section 18 and is fastened there detachably onto the dorsal section 18 by means of the fastening means 36. As a result, the dorsal section 18 is fastened by the strap section 22.

For example, the hook-and-loop-fastener strip 42 of the dorsal section 18 and the hook-and-loop-fastener strip 34 of the strap section 22 attach to each other.

In doing so, the strap section 22 in total runs counter the principal direction H, thus from the trigger section 20 to the wrist-side edge 26, although not directly.

The excess length of the strap section 22, thus a portion of the strap section 22 protruding beyond the fastening means 36, can then be wound around the wrist and, if applicable, fixed securely in place by means of a clip or a hook-and-loop-fastener strip onto the dorsal section 18 or onto another portion of the strap section 22 itself.

The user can now actuate the trigger 52 simply by moving the thumb. As a result, the electrical state of the contact element 49 changes, which can be recognized by the inserted electronic module 14. Subsequently, the electronic module 14 can execute a predefined action, for example a scanning process by means of a barcode scanner. Thus, the electronic module 14 can be actuated by means of the trigger 52.

In the shown embodiments, the path of the strap section 22 in the closed state is a V-shape or V-shaped, wherein the first line of the V-shape starts at the trigger section 20 and the tip of the V-shape is formed by the first opening 40, which is where the strap section 22 changes direction. The second line of the V-shape is then formed by the portion of the strap section 22 that passed through the first opening 40 and is fastened onto the fastening means 36.

In this way, a receiving space for the user's hand is formed between the strap section 22 and the dorsal section 18.

In particular, the thumb extends through an area that is defined by the lines of the V-shape and the thumb-side edge 24 of the dorsal section 18.

Thus, the dorsal section 18 and the entire glove 12 is fastened securely, reliably and permanently on the user's hand by means of the strap section 22, irrespective of the size of the user's hand. Thus, the glove 12 is a universal size that fits any hand. There is thus a model for the right hand and a different model for the left hand. However, these models are only required in one universal size.

In the shown embodiment, the strap section 22 extends from the trigger section 20. It is also conceivable that the trigger section 20 extends from the side-of-the-hand edge 28 of the dorsal section 18 and the trigger section 20 has the first opening 40.

Figure 5:
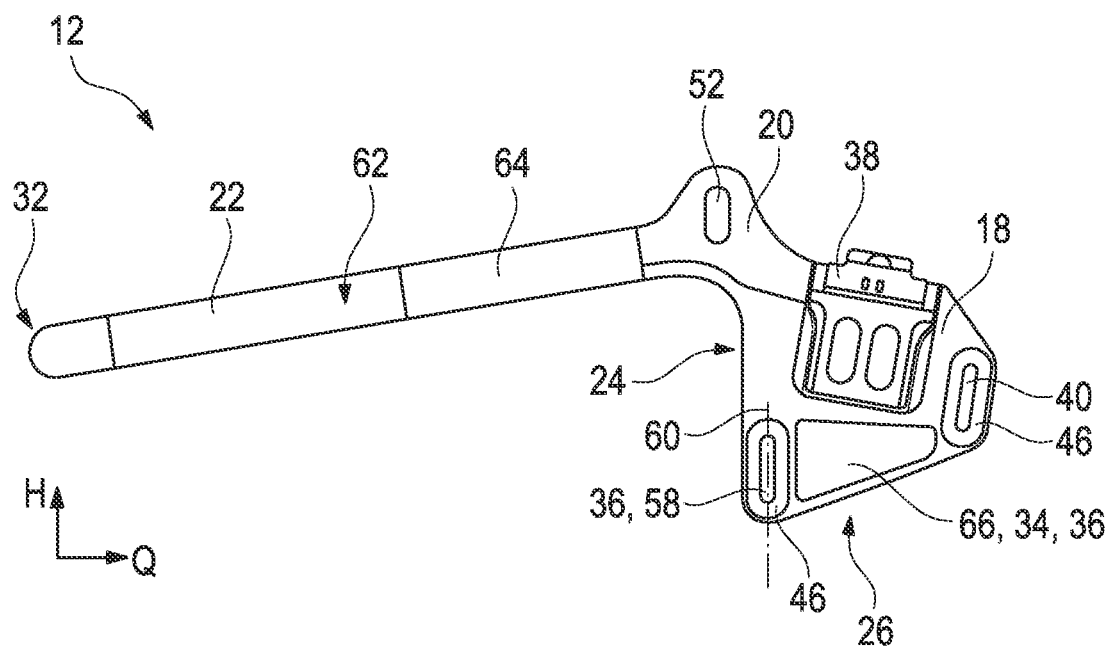
FIG. 5 shows a top view according to FIG. 1 of a second embodiment of a glove according to the disclosure.
Figure 6:
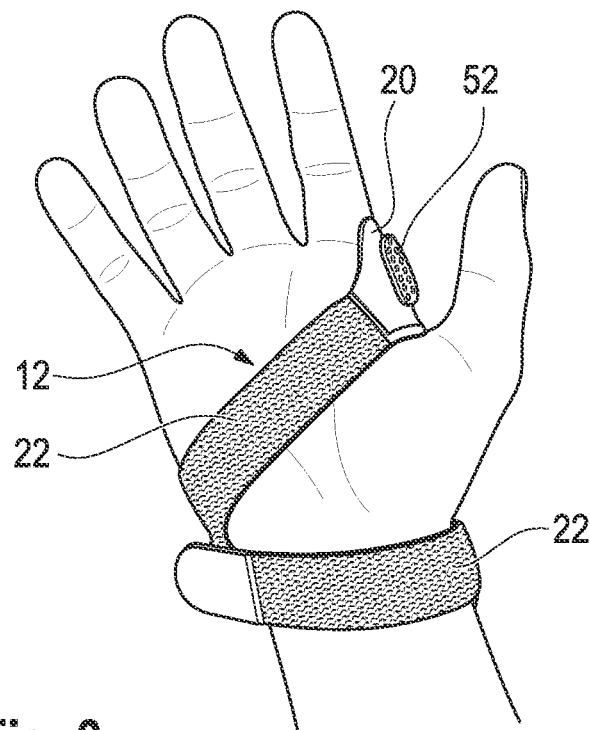
FIG. 6 shows the glove according to FIG. 5 worn on a user's hand in the correctly worn state with a view of the palm of the hand.

In FIGS. 5 and 6, a second embodiment of the glove 12 according to the disclosure is shown that substantially corresponds to the first embodiment so that that only the differences are discussed hereinafter. Identical and functionally equivalent parts are provided with the same reference signs.

In the second embodiment, the fastening means 36 is designed differently. The fastening means 36 now comprises a second opening 58 in the dorsal section 18. The second opening 58 matches the form of the first opening 40 so that the strap section 22 can be passed through.

The main axis 60 of the second opening 58 runs parallel to the thumb-side edge 24 and the second opening 58 adjoins the wrist-side edge 26.

The second opening 58 can also be reinforced using an eyelet 46.

The second opening 58 is located in particular closer to the wrist-side edge 26 than the first opening 40.

The strap section 22 now has two hook-and-loop-fastener strips 62, 64 on its top side and/or underside which are complementary to each other so that they attach to each other.

For example, both hook-and-loop-fastener strips 62, 64 extend together across 50%, in particular 85% of the length of the strap section 22.

In FIG. 6, the glove 12 of the second embodiment is shown on the user's hand in the correctly worn state.

As described for the first embodiment, the strap section 22 runs in a V-shape. The portion of the strap section 22 that passed through the first opening 40 is however guided through the second opening 58 that thus completes the second line of the V-shape.

When the strap section 22 has been guided through the second opening 58, the dorsal section 18 is fastened.

The excess length of the strap section 22 can then be guided back the same way so that the excess length of the strap section 22 comes to rest across the second line of the V-shape and is fastened there by means of the hook-and-loop-fastener strips 62, 64.

Alternatively, the excess length can be wrapped around the wrist and detachably fastened to the dorsal section 18, for example by means of a hook-and-loop-fastener strip 66 that is similar to the one of the first embodiment. This hook-and-loop-fastener strip 66 can be part of the fastening means 36 so that it corresponds to hook-and-loop-fastener strip 34.

In this way, it is possible to ensure the secure fastening of the glove 12 and the dorsal section 18 to the user's hand irrespective of the size of the hand.

The invention claimed is:

1. A glove comprising a dorsal section, a strap section, a trigger and a holder for an electronic module that is attached to the dorsal section,
wherein the dorsal section comprises a thumb-side edge, a wrist-side edge and a side-of-the-hand edge,
wherein the dorsal section has a first opening being a through hole extending through the dorsal section,
wherein the strap section passes through the first opening in a closed state of the glove and a portion of the strap section that passed through the first opening fastens the dorsal section detachably,
wherein portions of the holder and the first opening are equidistant from the wrist-side edge in a principal direction, the principal direction extending from the wrist-side edge towards a finger-side edge,
wherein the first opening is on the side-of-the-hand edge and the strap section extends from the thumb-side edge,
wherein a fastener for detachable fastening of the portion of the strap section that passed through the first opening is located on the dorsal section, and wherein the fastener comprises a second opening, through which the strap section extends in the closed state,
wherein the second opening is located on the thumb-side edge,
wherein the first opening is located in the principal direction closer to the wrist-side edge than at least one of a trigger section on which the trigger is attached or a permanently connected end of the strap section, and
wherein the second opening is closer to the wrist-side edge than the first opening.

2. The glove according to claim 1, wherein the trigger section is provided on the thumb-side edge of the dorsal section, and wherein the strap section extends from the trigger section or wherein the first opening is provided on the trigger section.

3. The glove according to claim 2, wherein the trigger section comprises a tongue that extends away in the principal direction both from the strap section as well as from a rest of the dorsal section.

4. The glove according to claim 2, wherein the trigger section is provided between the strap section and a rest of at least one of the dorsal section or the strap section starts at an edge of the trigger section facing away from the rest of the dorsal section.

5. The glove according to claim 1, wherein the strap section runs towards the wrist-side edge in the closed state counter to the principal direction or a path of the strap section in the closed state is a V-shape.

6. The glove according to claim 1, wherein the glove is designed without any loops for fingers or a palm section in an open state.

7. The glove according to claim 1, wherein the fastener is located in the principal direction closer to the wrist-side edge than at least one of the first opening, the trigger section on which the trigger is attached, or the permanently connected end of the strap section.

8. The glove according to claim 1, wherein the glove has a base body that comprises the dorsal section, the strap section and the trigger section on which the trigger is attached.

9. The glove according to claim 1, wherein, when the glove is in an open state on a flat surface, an angle $\alpha$ between the strap section and a portion of the thumb-side edge of the dorsal section extending toward the strap section in the principal direction is less than 90°.

10. The glove according to claim 1, wherein the first opening is the only opening on the side-of-the-hand edge.

11. The glove according to claim 1, wherein the strap section has a free end and the end permanently connected to the trigger section, wherein a length of the strap section, from its free end to its end permanently connected to the trigger section, is at least 250 mm.

12. The glove according to claim 1, wherein a width of the strap section is smaller than 25 mm.

13. The glove according to claim 1, wherein a main axis of the first opening and a portion of the thumb-side edge extending toward the strap section in the principal direction form an angle $\beta$ of less than 90°.

14. The glove according to claim 1, wherein the side-of-the-hand edge with the thumb-side edge form an angle that is less than 90°.

15. The glove according to claim 1, wherein the glove comprises only one strap section.

16. The glove according to claim 1, wherein a top edge of the holder is positioned above a top edge of the first opening in the principal direction.

17. A wearable sensor device comprising a glove and an electronic module that is inserted into a holder,
wherein the glove comprises a dorsal section, a strap section, a trigger and the holder for the electronic module that is attached to the dorsal section,
wherein the dorsal section comprises a thumb-side edge, a wrist-side edge and a side-of-the-hand edge,
wherein the dorsal section has a first opening being a through hole extending through the dorsal section,
wherein the strap section passes through the first opening in a closed state of the glove and a portion of the strap section that passed through the first opening fastens the dorsal section detachably,
wherein portions of the holder and the first opening are equidistant from the wrist-side edge in a principal direction, the principal direction extending from the wrist-side edge towards a finger-side edge,
wherein the first opening is on the side-of-the-hand edge and the strap section extends from the thumb-side edge,
wherein a fastener for detachable fastening of the portion of the strap section that passed through the first opening is located on the dorsal section, and wherein the fastener comprises a second opening, through which the strap section extends in the closed state,
wherein the second opening is located on the thumb-side edge,
wherein the first opening is located in the principal direction closer to the wrist-side edge than at least one of a trigger section on which the trigger is attached or a permanently connected end of the strap section, and
wherein the second opening is closer to the wrist-side edge than the first opening.

18. A glove, comprising:
a dorsal section,
a strap section,
a trigger, and a holder for an electronic module that is attached to the dorsal section, wherein the dorsal section comprises a thumb-side edge, a wrist-side edge and a side-of-the-hand edge, wherein the dorsal section has a first opening being a through hole extending through the dorsal section, wherein the strap section passes through the first opening in a closed state of the glove and a portion of the strap section that passed through the first opening fastens the dorsal section detachably, wherein the glove comprises only one single strap section, wherein the first opening is on the side-of-the-hand edge and the strap section extends from the thumb-side edge, wherein a fastener for detachable fastening of the portion of the strap section that passed through the first opening is located on the dorsal section, and wherein the fastener comprises a second opening, through which the strap section extends in the closed state, wherein the second opening is located on the thumb-side edge, wherein the first opening is located in a principal direction closer to the wrist-side edge than at least one of a trigger section on which the trigger is attached or a permanently connected end of the strap section, and wherein the second opening is closer to the wrist-side edge than the first opening.

\* \* \* \* \*